United States Patent [19]

Buck et al.

[11] Patent Number: 4,500,895

[45] Date of Patent: Feb. 19, 1985

[54] DISPOSABLE INK JET HEAD

[75] Inventors: Roy T. Buck; Frank L. Cloutier; R. Ernst Erni; Robert N. Low, all of Corvallis, Oreg.; F. Duncan Terry, Boise, Id.

[73] Assignee: Hewlett-Packard Company, Palo Alto, Calif.

[21] Appl. No.: 490,754

[22] Filed: May 2, 1983

[51] Int. Cl.[3] .............................................. G01D 15/18

[52] U.S. Cl. .............................................. 346/140 R

[58] Field of Search .................................... 346/140 R

[56] References Cited

U.S. PATENT DOCUMENTS 3,953,862 4/1976 Amberntsson et al. ............. 346/140
4,025,928 5/1977 Hou et al. ........................... 346/140
4,306,245 12/1981 Kasugayama et al. ............. 346/140
4,383,263 5/1983 Ozawa ................................ 346/140
4,419,677 12/1983 Kasugayama ....................... 346/140
4,438,191 3/1984 Cloutier .......................... 346/140 X

*Primary Examiner*—Joseph W. Hartary
*Attorney, Agent, or Firm*—Jeffery B. Fromm

[57] ABSTRACT

A thermal ink jet head is disclosed in which the jetting resistors, fluid interconnections, ink reservoir, electrical connections, and jetting orifices are fully integrated to provide an inexpensive, disposable jetting head. The entire hydraulic ink system is sealed to eliminate user interaction with the liquid ink, and ink can only exit the head via the jetting orifices under the influence of the jetting resistors. Once the ink is expended the user disposes with the old head and installs a new one by breaking and making a simple mechanical and low voltage electrical connection.

10 Claims, 2 Drawing Figures

DISPOSABLE INK JET HEAD

BACKGROUND OF THE INVENTION

Several workers (e.g., Amberntsson, et al., U.S. Pat. No. 3,953,862 issued Apr. 27, 1976, Hon, et al., U.S. Pat. No. 4,025,928 issued May 24, 1977, and Kasugajama, et al., U.S. Pat. No. 4,306,245 issued Dec. 15, 1981) have disclosed ink jetting devices for printing, and the overall versatility of ink jetting for both printing and plotting is well known. Unfortunately previous ink jet printers and their key element, the ink jet head, have been both expensive and complex. Because of the expense and complexity of these prior ink jet heads, prior workers have had to insure that the heads could be used continuously over a period of several years and tens of thousands of sheets of writing, that the ink supply could be refilled, and that various parts of the assembly which required maintenance were accessible for cleaning and repair. Naturally, each of these requirements in the prior art served to further increase both complexity and expense. Finally, and for many users most unfortunately, the users were often faced with the unwanted, awkward and potentially messy task of refilling an ink reservoir or, at best, replacing an ink cartridge. In either case, the user was required to disconnect and reconnect some form of fluid coupling or fluid plug, thereby exposing both hands and clothing to the liquid ink.

SUMMARY OF THE INVENTION

The present invention solves the problems of prior art ink jet heads by providing a head which is simple and inexpensive enough to be disposable. The head is totally self-contained with a single unit including a sealed ink reservoir, ink, jetting mechanism (i.e., thermal thin film resistors), electrical connections (i.e., thin film conductive runs and pads), fluid interconnection, and jetting orifices. Once the ink in the sealed reservoir is used up, typically requiring about 500 full pages of text printing, the entire head is thrown away and replaced with a new head. It is therefore only necessary for the user to break and make a mechanical and an electrical connection, usually having a harmlessly low voltage, and it is never necessary for the user to handle a fluid (i.e., ink) coupling.

DETAILED DESCRIPTION OF THE INVENTION

Figure 1:
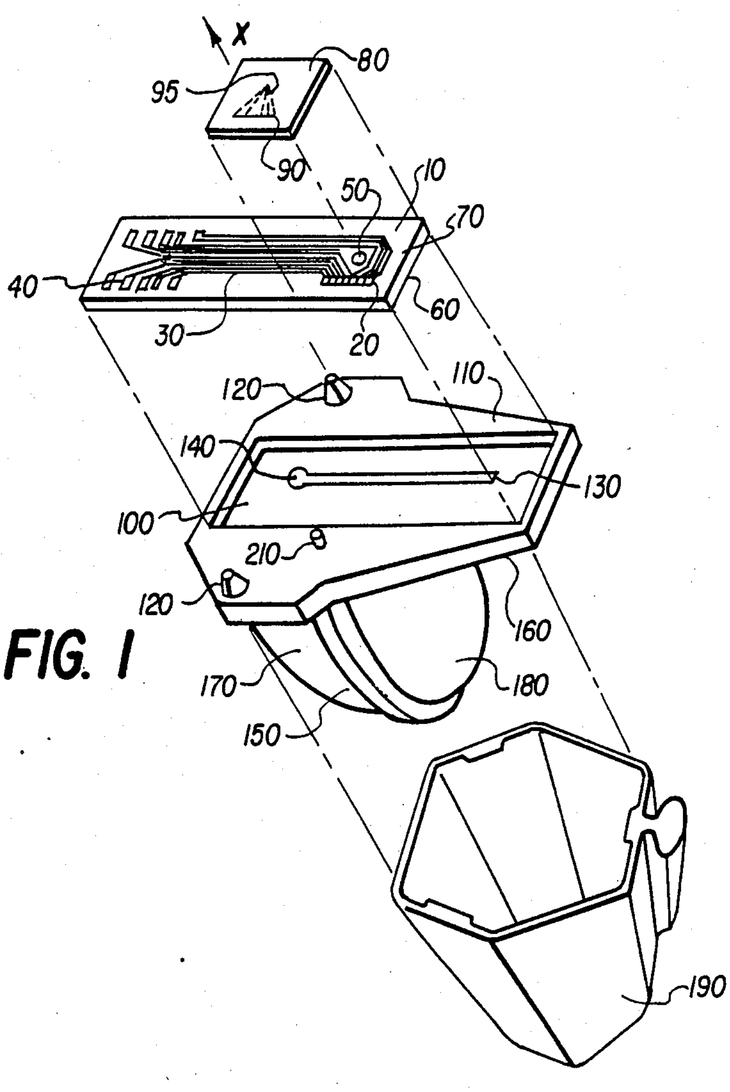
FIG. 1 shows an exploded view of a disposable ink jet head according to the preferred embodiment of the present invention.

FIG. 1 shows an exploded view of the disposable ink jet head. A glass or ceramic substrate 10 carries a plurality of thin-film thermal jetting resistors 20 and thin-film metal electrical connecting runs 30 and pads 40. A jet feed hole 50 is provided through the substrate 10 to permit the flow of ink from the reservoir side 60 to the jetting side 70 of the substrate 10.

An orifice plate 80 is attached to the substrate 10 by, for example, an epoxy adhesive or solder. The orifice plate 80 is composed of glass, ceramic, or a metal such as nickel and contains a plurality of small (1–3 millinch) drop expulsion holes 90, one associated with each jetting resistor 20, to provide both a jetting chamber and orifice needed for proper ink jetting toward a print media (paper) in the direction X. The orifice plate 80 is also provided with grooves 95 on the side facing the substrate 10 which mate with the substrate 10 to permit the flow of ink from the jet feed hole 50 to the drop expulsion holes 90 by capillary action. The orifice plate 80 also provides mechanical protection to prevent abrasion or impact damage to the jetting resistors 20 during shipment and use.

The substrate 10 is mounted and sealed by an adhesive in a recess 100 in a plastic molded backing plate 110. The backing plate 110 serves several purposes: (1) it mechanically supports the substrate 10; (2) it is provided with molded in place alignment pins 120 used to align the entire head in the printer; and (3) it is provided with a molded in place groove 130 and feed hole 140, which when mated with the reservoir side 60 of the substrate 10 provide a capillary feed line for the ink to the jet feed hole 50.

An elastic hollow ink reservoir 150 is adhesively mounted and sealed to the rear side 160 of the backing plate 110. The ink reservoir 150 is made either as a single piece of resilient flexible silicone rubber (not shown), or from a relatively inflexible plastic half-shell 170 glued to a flexible, resilient plastic half-shell 180, in the general shape of a sewing thimble. In either case, the ink reservoir 150 serves not only to contain the ink which in use can only exit via the feed hold 140, but also to provide back pressure on the ink so that the ink will only exit the drop expulsion holes 90 when the jetting resistors 20 are energized.

Figure 2:
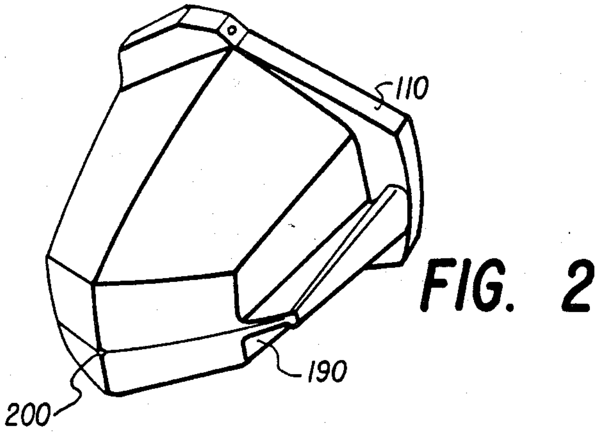
FIG. 2 shows a second view of the disposable ink jet head as shown in FIG. 1.

A plastic molded outer housing 190 is then adhesively mounted to the rear side 160 of the backing plate 110 to provide firm mechanical protection for the ink reservoir 150. As ink is expelled from the drop expulsion holes 90, the ink reservoir 150 (or the half-shell 180 in the case of the two-piece construction) slowly collapses. It is therefore necessary to provide an air-pressure equalization vent 200, which is a hole through the outer housing 190, as shown in FIG. 2 to prevent the creation of a partial vacuum within outer housing 190.

The ink reservoir 150 is filled via fill hole 210, which is a hole through the back plate 110 to the ink reservoir 150, as shown in FIG. 1. The ink reservoir 150 is filled by first drawing a partial vacuum on fill hole 210 to remove the majority of the air within the ink reservoir 150, then allowing liquid ink to be sucked into the ink reservoir 150 under the influence of the partial vacuum. The fill hole 210 is then plugged and sealed to prevent ink from later escaping from the ink reservoir 150 except from the drop expulsion holes 90 when the jetting resistors 20 are energized. The ink pathway through the entire ink jet head is thus hydraulically sealed except for the small drop expulsion holes 90.

In use, the head is aligned in the printer by the alignment pins 120 and held in place by a clamp (not shown) to either the backing plate 110 or the outer housing 190. The printer contains electrical contacts (not shown) which are arranged to mate with the pads 40 to provide the necessary electrical signals to energize the jetting resistors 20. Thus, it is no longer necessary for the user to break or make any liquid connections as the ink is used up since the head is now a single, hydraulically sealed unit with a self-contained ink supply. When the ink is finally expended, the entire head is discarded and replaced with a new head.

What we claims is:

1. A printing apparatus for jetting ink in an ink jet printer comprising:
- a collapsible ink reservoir;
- a substrate having jetting means disposed on the substrate for imparting momentum to the ink, and electrical connection means for energizing the jetting means;
- orifice means connected to the substrate and covering the jetting means for providing an orifice through which the ink is jetted under the influence of the momentum imparted by the jetting means;
- support means coupled to and mechanically supporting the ink reservoir and the substrate for providing a sealed hydraulic connection therebetween for the ink;
- fill means coupled to the ink reservoir for substantially filling the collapsible ink reservoir with ink; and
- plug means coupled to the fill means for hydraulically sealing the fill means so that the only exit for the ink from the ink reservoir is through the orifice means.

2. A printing apparatus as in claim 1, further comprising:
- housing means coupled to the support means and substantially surrounding the ink reservoir for providing mechanical protection for the collapsible ink reservoir; and
- an air vent through the housing means to prevent a partial vacuum from forming around the ink reservoir.

3. A printing apparatus as in claim 1, wherein the collapsible ink reservoir is resilient to provide a negative back pressure on the ink.

4. A printing apparatus as in claim 1, further comprising alignment means coupled to the support means for aligning the printing apparatus with the ink jet printer.

5. A printing apparatus as in claim 1, wherein the jetting means is a thermal resistor.

6. A printing apparatus as in claim 5, wherein the thermal resistor if a film resistor deposited on the substrate.

7. A printing apparatus as in claim 6, wherein the film resistor if a thin film resistor.

8. A printing apparatus as in claim 6, wherein the electrical connection means comprises:
- film conductor runs deposited on the substrate and connected to the film resistor; and
- film conductor pads deposited on the substrate and terminating the film runs for external electrical connection.

9. A printing apparatus as in claim 8, wherein the film conductor runs and pads are thin film conductors.

10. A method of filling with liquid ink an ink reservoir having a fill hole in a disposable ink jet head, comprising the steps of:
- drawing a partial vacuum on the fill hole to create a partial vacuum in the ink reservoir;
- allowing liquid ink to be sucked through the fill hole into the ink reservoir under the influence of the partial vacuum; and
- permanently and mechanically sealing the fill hole, so that ink cannot later enter or escape from the ink reservoir through the fill hole.

* * * * *

UNITED STATES PATENT AND TRADEMARK OFFICE

CERTIFICATE OF CORRECTION

PATENT NO. : 4,500,895

DATED : February 19, 1985

INVENTOR(S) : Roy T. Buck, Frank L. Cloutier, R. Ernst Erni, Robert N. Low, F. Duncan Terry It is certified that error appears in the above—identified patent and that said Letters Patent is hereby corrected as shown below:

Column 2, line 68, "claims" should read -- claim --;

Column 4, line 10, "resistor if" should read -- resistor is --;

Column 4, line 13, "resistor if" should read -- resistor is --;

Signed and Sealed this

*First* Day of *October 1985*

[SEAL]

*Attest:*

DONALD J. QUIGG

*Attesting Officer*

*Commissioner of Patents and Trademarks—Designate*